July 5, 1938.   J. L. HULBERT   2,122,471
MILKING MACHINE
Filed Aug. 26, 1936   2 Sheets-Sheet 1

WITNESS:

INVENTOR
John L. Hulbert
BY
Buser and Harding
ATTORNEYS.

July 5, 1938. J. L. HULBERT 2,122,471
MILKING MACHINE
Filed Aug. 26, 1936 2 Sheets-Sheet 2
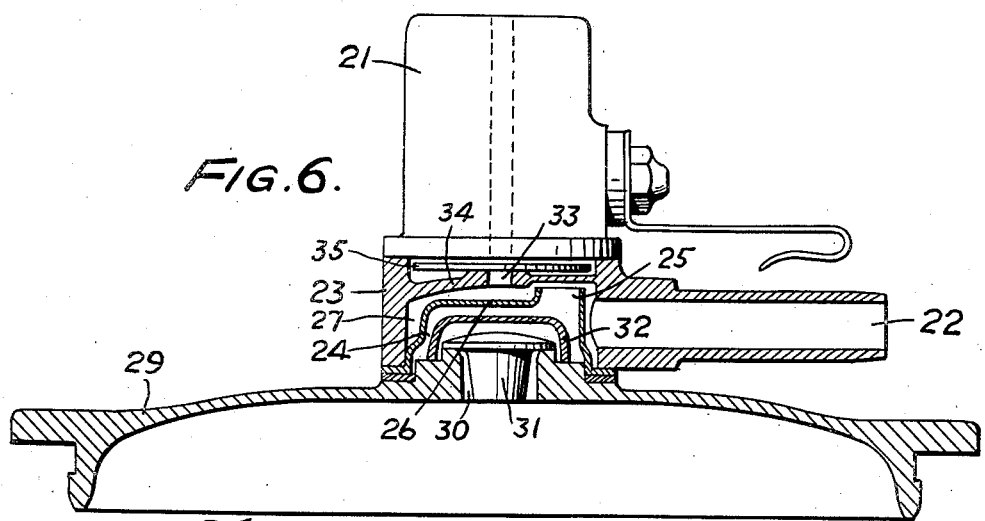
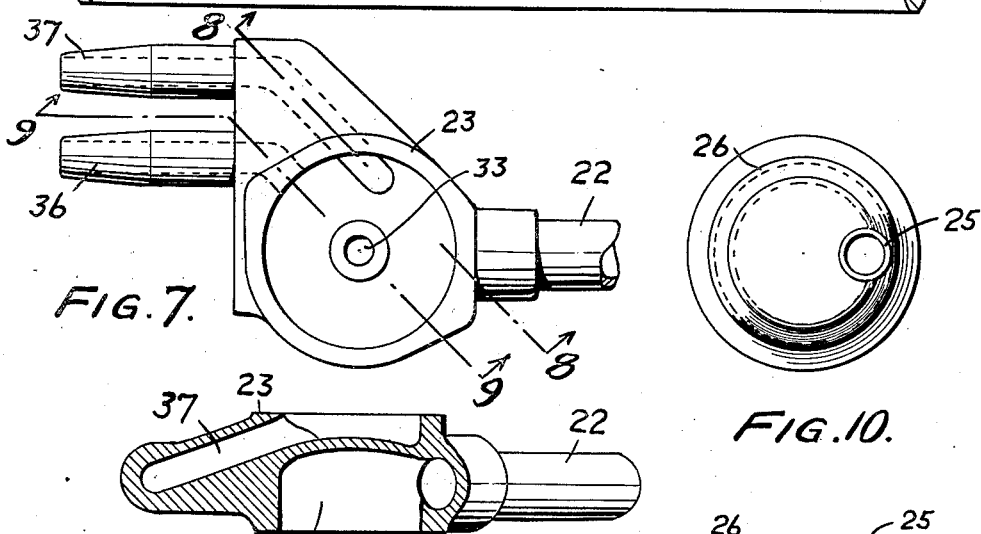
INVENTOR
John L. Hulbert
BY
Busser and Harding
ATTORNEYS Patented July 5, 1938

2,122,471

UNITED STATES PATENT OFFICE 2,122,471

MILKING MACHINE

John L. Hulbert, Poughkeepsie, N. Y., assignor to The De Laval Separator Company, New York, N. Y., a corporation of New Jersey Application August 26, 1936, Serial No. 97,881

3 Claims. (Cl. 31—62)

My invention relates to milking machines wherein the milk pail is kept under partial vacuum and has for its object the prevention of entrance to the pail from the piping of water, vapor or air, which may be contaminated with many kinds of bacteria.

A very efficient device for effecting this object is the double check valve arrangement set forth in the patent to Meredith Leitch, No. 1,394,433, issued October 18, 1921. This arrangement operates satisfactorily under most operative conditions. Under certain exceptional conditions, however, the device does not operate perfectly. My invention in its preferred form embodies the Leitch invention but is an improvement thereon and has for its object to insure perfect functioning under all conditions.

By extensive experiment and testing I have found that if the air from the pail passes through a suitable check valve arrangement, preferably double check valves similar to Leitch's, into one chamber and then, through a high level passage, directly or indirectly, into the vacuum pipe, while the air from the teat cups passes through another chamber to the vacuum pipe, moisture and air will, under all conditions, be effectively excluded from the pail.

In the accompanying drawings which show two preferred embodiments of the invention:—

Fig. 6 is a view, similar to Fig. 1, of my invention as applied to a milking machine equipped with an electrically operated pulsator.

Fig. 7 is a plan view of the valve chamber shown in Fig. 6.

Figure 1:
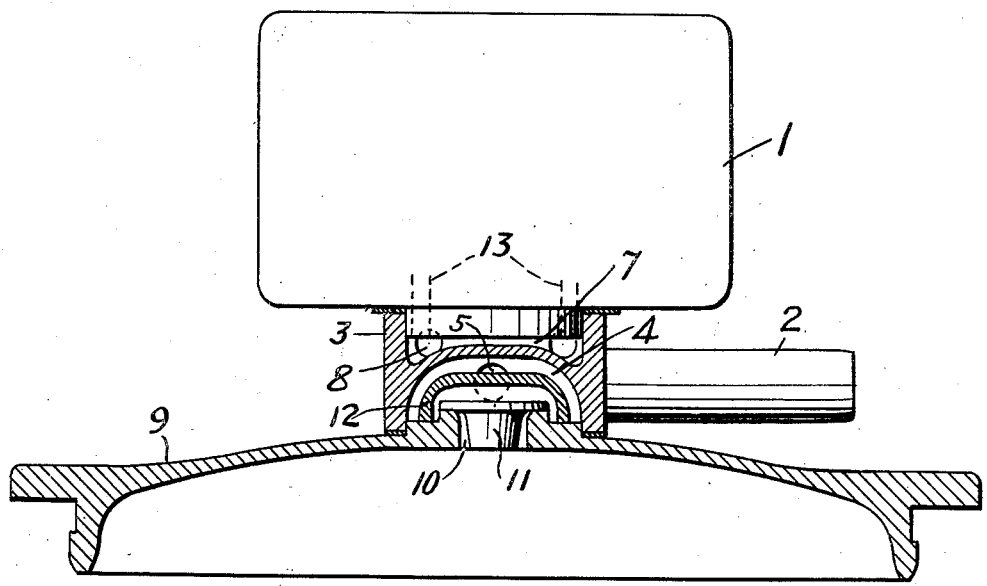
Fig. 1 is an elevation, partly in section, showing my invention as applied to a milking machine equipped with an automatic pneumatic pulsator.
Figure 2:
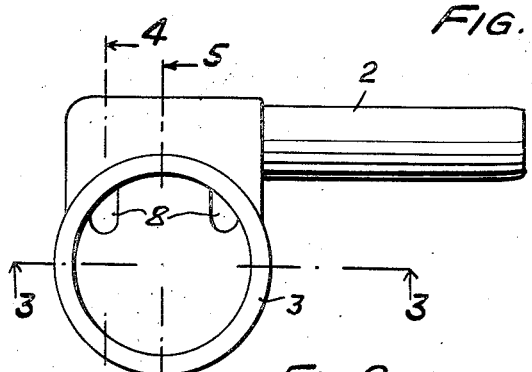
Figs. 2, 3, 4 and 5 are respectively a plan view, a longitudinal section, and two cross sections, taken on the lines indicated on Figs. 2 and 3, of the valve chamber shown in Fig. 1.
Figure 3:
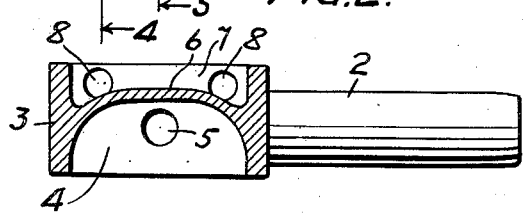
Figure 4:
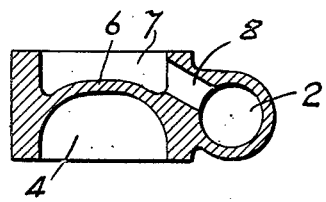
Figure 5:
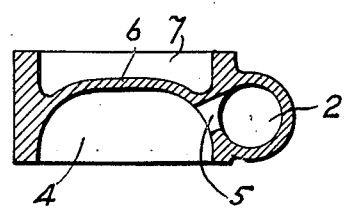

Figs. 8 and 9 are respectively sectional views on the lines 8—8 and 9—9 of Fig. 7.

Figs. 10 and 11 are a plan and a section respectively of the partition embodied in the device shown in Fig. 6.

Referring first to the embodiment shown in Figs. 1 to 5: 1 is an automatic pulsator operated by differences in pneumatic pressure, usually between atmospheric pressure and a partial vacuum. A pulsator of this type is shown in a patent issued to me November 1, 1932, No. 1,885,110. An improvement therein is shown in my pending application filed April 20, 1935, Serial No. 17,385. 2 is a tube adapted to be connected to a source of partial vacuum. 3 is a body containing a lower chamber 4 communicating with the tube 2 by a passage 5 and separated by a partition 6 from an upper chamber 7 communicating with the passage 2 by one or more passages 8. The outlet end of passage 5 is substantially above the bottom of tube 2.

The body 3 rests on a pail cover 9 having a central hole 10 to permit exhaustion of air from the pail and two check valves 11 and 12 in series, like that shown in the Leitch patent above mentioned, to prevent reverse flow of air or liquids.

13—13 indicate air ports from the pulsator 1 to the upper chamber 7.

Referring to Figs. 6 to 11: 21 is an electrically operated pulsator. 22 is a tube adapted to be connected to a source of vacuum. 23 is a body within which there is a lower and inner chamber 24, communicating with an upper and outer chamber 27 through a short tube 25 on the partition 26 which separates the two chambers.

The outer chamber 27 is in direct communication with the tube 22. The outlet end of tube 25 is above the level of vacuum tube 22.

The body 23 rests on a pail cover 29 having a central hole 30 to permit exhaustion of air from the pail and two check valves 31 and 32 in series to prevent reverse flow of air or liquids.

33 is an air port in the web 34 (overlying chamber 27) of the body 23 and connecting the space above the web with chamber 27. Port 33 is adapted to be alternately opened and closed by a magnetically operated disc valve 35.

Chamber 27 has a nozzle 36 communicating with the air outlet from a secondary pulsator in a claw (not shown) communicating with the pulsation chambers of a set of teat cups (not shown). The space above the web 34 overlying chamber 27 has a nozzle 37 which has a tube connection with the motor chamber of the secondary pulsator. The details of a pulsator (21) suitable for use in connection with the construction of Fig. 6 are shown in the patent issued to me August 29, 1933, No. 1,924,931 and the details of a secondary pulsator suitable for use therewith are shown in Patent No. 1,257,688 issued Feb. 26, 1918 to Robert Forsyth.

Since the details of pulsators adapted to cooperate with the constructions shown in Figs. 1 and 6, respectively, are disclosed in the prior art cited and since their operation has no bearing on the present invention, which is not dependent for its operation upon any particular pulsator construction, there is no occasion to show the pulsators in detail or describe their operation. It is sufficient to say that, from either pulsator, air is discharged intermittently through ports 13, or through port 33 and nozzle 36, into chamber 7 or 27, whence it passes to the vacuum tube, 2 or 22, while air exhausted from the pail, through hole 10 or hole 30, passes valves 11 and 12, or valves 31 and 32, thence through passage 5 directly to tube 2, or through short tube 25 and chamber 27 to tube 22. In either case bacteria or moisture-contaminated air from the teat cups and pulsator enters a chamber different from that surrounding the check valves on the pail top, and escapes through the tube 2 or 22 to the source of vacuum without entering the check valve chamber.

What I claim and desire to protect by Letters Patent is:

1. In a milking machine including means providing a passage to a source of vacuum, a pulsator adapted for connection with teat cups and a pail adapted to receive milk from said cups and having an air outlet: means allowing exhaust of air from said pail to said vacuum passage and preventing reverse flow to the pail of impure air from said cups and pulsator, said means comprising check valve mechanism at the air outlet of the pail, a body connected with the vacuum tube, and a partition within said body dividing it into two chambers both communicating with the vacuum passage, one of said chambers containing said check valve mechanism and being adapted to receive air from the pail, the other of said chambers being adapted to receive air from said pulsator and teat cups.

2. In a milking machine including means providing a passage to a source of vacuum, a pulsator adapted for connection with teat cups and a pail adapted to receive milk from said cups and having an air outlet: means allowing exhaust of air from said pail to said vacuum passage and preventing reverse flow now to the pail of impure air from said cups and pulsator, said means comprising check valve mechanism at the air outlet of the pail, a body connected with the vacuum tube, and a partition within said body dividing it into two chambers both communicating with the vacuum passage, one of said chambers being adapted to receive air from said pulsator and teat cups and discharge it into the vacuum passage, the other containing said check valve mechanism and being adapted to receive air from the pail and discharge it into the vacuum passage through an opening higher than the bottom of said passage.

3. In a milking machine including means providing a passage to a source of vacuum, a pulsator adapted for connection with teat cups and a pail adapted to receive milk from said cups and having an air outlet: means allowing exhaust of air from said pail to said vacuum passage and preventing reverse flow to the pail of impure air from said cups and pulsator, said means comprising two separate chambers discharging to the vacuum passage, and check valve mechanism at the air outlet of the pail, one of said chambers enclosing said check valve mechanism and the other adapted to receive air from said pulsator and teat cups, the second named chamber discharging directly into the vacuum passage and the first named chamber discharging into the vacuum passage by way of the upper part of the second named chamber.

JOHN L. HULBERT.